United States Patent
Mirtsch et al.

(10) Patent No.: US 6,217,811 B1
(45) Date of Patent: Apr. 17, 2001

(54) PROCESS AND APPARATUS FOR VAULT-STRUCTURING OF THIN MATERIAL SHEETS

(75) Inventors: Frank Mirtsch; Olaf Büttner; Jochen Ellert, all of Berlin (DE)

(73) Assignee: Dr. Mirtsch GmbH, Teltow (DE)

( * ) Notice: Subject to any disclaimer, the term of this patent is extended or adjusted under 35 U.S.C. 154(b) by 0 days.

(21) Appl. No.: 09/158,217

(22) Filed: Sep. 22, 1998

Related U.S. Application Data

(63) Continuation-in-part of application No. PCT/EP97/01465, filed on Mar. 22, 1997.

(30) Foreign Application Priority Data

Mar. 23, 1996 (DE) ................................. 196 11 478

(51) Int. Cl.⁷ ................. B29C 53/04; B29C 53/08; B29C 69/02; B21D 7/08; B21D 9/10

(52) U.S. Cl. ................ 264/285; 264/566; 264/557; 264/292; 264/295; 264/313; 264/320; 264/339; 72/57; 72/196; 72/421; 425/365; 425/374; 425/387.1; 425/392

(58) Field of Search ............... 264/557, 566, 264/371, 230, 285, 295, 313, 319, 339, 322, 284, 286, 287, 280, 294, 505, 506, 292, 320; 425/365, 374, 387.1, 392; 72/57, 421, 196

(56) References Cited

U.S. PATENT DOCUMENTS

| | | | |
|---|---|---|---|
| 3,130,412 | * 4/1964 | Fox et al. | |
| 3,481,830 | * 12/1969 | Hanke. | |
| 3,667,265 | * 6/1972 | Zippe | 72/84 |
| 4,027,517 | * 6/1977 | Bodnar | 72/177 |
| 4,059,000 | * 11/1977 | Bodnar | 72/197 |
| 4,576,669 | * 3/1986 | Caputo | 156/145 |
| 4,614,632 | * 9/1986 | Kezuka et al. | 264/280 |
| 4,842,794 | * 6/1989 | Hovis et al. | 264/145 |
| 5,238,642 | * 8/1993 | Benquet et al. | 264/284 |
| 5,626,944 | * 5/1997 | Rasmussen | 428/172 |
| 5,887,470 | * 3/1999 | Mirtsch | 72/57 |

FOREIGN PATENT DOCUMENTS

| | | |
|---|---|---|
| 2023775 | 1/1972 | (DE). |
| 4311978 | 4/1994 | (DE). |
| 2318680 | 10/1994 | (DE). |
| 4437986 | 4/1996 | (DE). |
| 1463640 | 12/1966 | (FR). |
| 58-131036 | 8/1983 | (JP). |
| 9422612 | 10/1994 | (WO). |

OTHER PUBLICATIONS

USPTO translation of WO 94/22612, Jun. 1999.*
USPTO translation of DE, 4,437,986, Jun. 1999.*

* cited by examiner

Primary Examiner—Jan H. Silbaugh
Assistant Examiner—Michael I. Poe
(74) Attorney, Agent, or Firm—Nils H. Ljungman & Associates

(57) ABSTRACT

According to the invention thin sheets of foil are stiffened in a particular way by means of vault-structuring. The vault-structuring occurs either by self-organizing or following a self-organized design with a spade-shaped or drop-shaped pattern.

21 Claims, 7 Drawing Sheets

PROCESS AND APPARATUS FOR VAULT-STRUCTURING OF THIN MATERIAL SHEETS

This application is a Continuation-In-Part application of International Application No. PCT/EP97/01465, filed on Mar. 22, 1997 which claims priority from Fed. Rep. of Germany Patent Application No. 196 11478.0, filed on Mar. 23, 1996. International Application No. PCT/EP97/01465 was pending as of the filing date of the present U.S. application and the U.S. was an elected state in the International Application No. PCT/EP97/01465.

BACKGROUND OF THE INVENTION

1. Field of the Invention

The invention concerns a process and an apparatus for vault-structuring, in which curved material sheets are pressurized using supporting elements spaced at certain distances from each other.

2. Background Art

Numerous processes for profiling thin material sheets are known, including well-known deformation technologies such as rolling-in or embossing of beads with the aid of complicated form tools to create three-dimensional stiffening. The drawback of these mechanical deformation processes is that sophisticated and expensive form tools are required, that the material sheets to be profiled are heavily plastified, and that the surface quality of the raw material is degraded by the mechanical surface pressure.

The European patent application 0 441 618 A 1 describes a profiling technique in which polyhedral structures are produced with the aid of two embossing rolls. An apparatus is known for embossing axial beads into cans by supporting the can by axial, rigid elements on the inside and applying pressure from the outside by means of an elastic press roller (DE 35 87 768 T 2). U.S. Pat. No. 4,576,669 suggests feeding plastic foil over a roll that carries small cups into which the plastic foil is sucked by vacuum pressure. This process, however, does not enhance the inherent stability of the material. A process in which round, dome shaped structures are impressed in a foil does likewise not considerably improve the inherent stability of the material because large regions remain undeformed between the dents (French patent application no. 1,283,530).

Furthermore, a process is known in which thin material sheets or foils are profiled dent-like. In the process, the curved thin material sheet or foil is supported by line-shaped supporting elements on the inside and hydraulically pressurized from the outside. Offset quadrangular dent structures result that considerably improve the inherent stability of the material sheet (Deutsche Offenlegungsschrift 25 57 215 [=Patent Application Open To Public Inspection], German printed patent specification DE 43 11 978). In principle, this dent-profiling process differs from the one described in patent application no. 0 441 618 A 1 in that not two mechanically acting embossing rollers are required but only a supporting core on which the material sheet rests and against which it is hydraulically pressed. The hydraulic production of polyhedral structures, e.g. hexagonal profiles, has been described in the International Patent Application published as PCT/EP 94/01043, FIGS. 5b and 5c). Instead of hydraulic pressure, an unprofiled, elastic cushion or an unprofiled elastomer can be used for pressurization. The supporting elements against which the material sheet is pressed are made of a flexible material which is either fixed or can move on the core.

The purely mechanical forming process described in the European printed patent specification no. 0 441 618 A 1 considerably affects the surface quality of the raw material by great mechanical deformation. The apparatus for producing axial beads described in DE 35 87 768 T 2 uses line-shaped, axial, rigid supporting elements and an elastic pressure element. However, the inherent stability of the material furnished with axial beads in this way is insufficient because, for geometrical reasons, beads do not yield multi-dimensional inherent stability. In contrast to beads the forming techniques described in O.S. 25 57 215, DE 43 11 978, and PCT/EP 94/01043 produce multi-dimensional inherent stability by creating offset vault structures without degrading the surface quality.

One of the problems of the known vault-structuring techniques is that, where the vaults in the profiled material are deep, local stretching and elongation occur, which can be so severe that considerable plastic deformation results, weakening the material so that it may tear.

Another problem of the known vault-structuring techniques for thin material sheets or foils is that the self-organizing of the folds that bring about the improvement of the inherent stability is not, or only insufficiently, made possible in some applications. Self-organization of the vault folds means a process in which the material is folded in several dimensions in a such way that its inherent stability is enhanced. For example, such vault-structuring is effected by the curved, thin material, which is supported on the inside by supporting collars spaced at certain distances from each other or a helical, rigid supporting spiral (O.S. 25 57 215), becoming instable due to external pressure. The instability triggers multi-dimensional folding of the material and offset, quadrangular vault structures are created. Thus the thin material is transferred into a new state, the most important characteristic feature of which is its improved inherent stability. One problem of these quadrangular vault structures is that severe plastic deformation may occur in the region of the vault folds which weaken the material. If, instead of rigid ones, flexible supporting elements (e.g. of rubber) are used which are allowed to move on a core in axial direction during the vault-structuring process, hexagonal vault structures are created. Such hexagonal vaults can also be produced by hexagonal, rigid supporting elements (PCT/EP 94/01043). Studies have shown that severe plastic deformation weakening the material may occur in the area of the hexagonal vault structures as well, similar as in the case of the offset, quadrangular vault structures. In addition, the material sheets thus profiled with quadrangular or hexagonal vault structures is difficult to flatten from the cylindrical into a flat shape without substantial loss of isotropic inherent stability. Studies have shown that the lateral vault folds arranged in the direction of feed of the material sheet can be bent into a flat shape only by application of considerable force. Because in this flattening process the vault folds perpendicular to the direction of feed of the material sheet are leveled and arched somewhat, the vault folds lose a portion of their initial inherent stability. The thicker the material sheets the more serious the problem, and no isotropic inherent stability of the profiled material sheets can be achieved in this way. Therefore, the known profiling techniques are limited to angular structures such as quadrangular and hexagonal profiles. Due to this limitation, the structure of the vault folds could not yet be optimized. Such optimization includes the geometry of the structure as well as the geometrical shape of the fold itself. The structure of the vaults, such as their size and depth, determines the increase in inherent stability at a given thickness of the material. The contours of the folds must adopt such a shape that despite their being smoothed only a minimum of plastic deformation occurs.

SUMMARY OF THE INVENTION

The solution of the task according to the invention is that the optimal shape of the vault folds is found out by presetting merely the macroscopic vault structure by means of supporting elements when profiling the material sheets by means of hydraulic or elastic pressure. The supporting elements subside in the course of the structuring, the structural folds themselves take over the function of the supporting elements, and the vault folds and troughs assume the optimal shape in such a way that they withstand the prevailing forming pressure with a minimum of plastification.

An embodiment of the process is that a curved thin material sheet or foil is supported on the inside by a flexible, helical supporting spiral and pressurized from the outside. The flexible supporting spiral slightly subsides to the external pressure, twisting in the process, so that the diameter of the supporting spiral slightly decreases. In this way first vault folds of roughly quadrangular shape form, which then self-adjust to an optimized shape. In the process the initially little developed vault folds of roughly quadrangular shape gradually take over the supporting effect of the supporting spiral, because the vault folds more and more support each other as the depth of the vault folds increases. On the other hand, the supporting effect of the supporting spiral gradually decreases as it yields more and more to the increasing pressure from outside of the material sheet. In this way the vault folds form themselves quasi automatically and, in a self-organizing process, assume the optimal shape that withstands the deformation pressure. This not only holds for the optimized geometrical arrangement of the vault structure but likewise for the shape of the individual vault folds, i.e. their outer contour or curvature.

The geometrical arrangements of the vault folds optimized through this process are, for example, structures shaped like a pointed spade with S-shaped flanks that arose from parallelograms the narrow sides of which are tapered and the long sides of which are rounded. The tapering vault folds are created in an optimized way by the fact that the self-organizing of the vault-structuring of a curved material sheet, which is supported on the inside by means of a helical supporting spiral, favors shortened vault folds parallel to the rotational axis of the supporting spiral, i.e. perdendicular to the direction of feed of the material sheet. The optimization of the shape of the individual vault folds in the direction of feed is demonstrated by the fact that only rounded (e.g. S-shaped) vault folds are created in that direction, i.e. vault kinks with a high degree of plastic deformation do not occur. In the regions of the material sheet where the vault folds meet, flattened folding saddles with smooth bending radii form. Thus multi-axis bending folds that would cause severe plastifications of the material are avoided.

Because the vault folds in the direction of feed of the material sheet are rounded and therefore can easily be deformed, they can be bent to a flat shape with little expenditure of force and a minimum of plastification. Additionally, the vault folds parallel to the rotational axis of the supporting spiral, i.e. perpendicular to the direction of feed of the material sheet, are shortened. The result is easy flattening of the material sheets structured in this way, while the isotropic inherent stability of the profiled material sheet is preserved. The result is a high degree of inherent stability of the material sheet at a minimum of plastic deformation. Therefore, thicker material sheets can be structured and flattened in this way.

However, the spade-shaped vault structures thus produced are not precisely uniform. The reasons for this are inevitable non-homogeneity and wall thickness tolerances of the material to be processed as well as uneven pressurization of the material sheet. Therefore, another embodiment of the process according to the invention is that the best possible conditions for the optimal forming of the vault structure are created. To achieve this, first the optimal folding is determined under self-organizing conditions, and then the supporting elements are designed thus that the vault structures evolving, in particular the contours of the folds, to a large extent correspond with the geometry as formed through self-organization.

The characteristic feature of the supporting elements optimized in this way is that the lateral supporting elements are rounded (e.g. S-shaped) and that the supporting elements result in a flattened or just slightly curved contour in the region where several supporting elements converge. The radii of the individual rounded (e.g. S-shaped) lateral supporting elements are not fixed. The result is a wide variation range of roughly spade-shaped vault structures with a high inherent stability and low plastic deformation of the raw material. The shortened vault folds perpendicular to the direction of feed of the material sheet are to be just slightly plastified as well, and therefore the supporting elements receive rounded contours.

The geometrical dimensions of the optimized supporting elements can be calculated by approximation with the aid of equation (1). Equation (1) was developed by trial for the self-organization of roughly quadrangular vault structures (O.S. 25 57 215) and it can also be used for roughly spade-shaped vault structures.

$$n = \frac{2.45 * D^{0.5}}{h^{0.333} * s^{0.2}} \quad (1)$$

where n=number of vault structures in the direction of feed of the material sheet referred to one turning cycle of the supporting elements D=diameter in mm of the supporting elements h=mean distance in mm of the lateral supporting elements from each other s=thickness in mm of the material sheets With the geometric relation (2) for the vault number n on the circumference of the supporting elements $$n = \frac{D * \pi}{b} \quad (2)$$

relation (3) results for the dimensions of roughly square vault structures (h=b):

$$h=b=1.45*D^{0.75}*s^{0.3} \quad (3)$$

This equation valid for roughly square vault structures can by approximation be applied to roughly spade-shaped vault structures as well, with the mean distance in mm of the lateral supporting elements chosen for h. Because equation (3) is just an approximation for roughly spade-shaped vault structures, the conditions of equation (3) can to some extent be altered.

From equations (1), (2), and (3) it follows, for example, that the greater the wall thickness s of the material sheet to be profiled, the greater the distance h between the supporting elements will be, and the greater the diameter D of the supporting elements has to be chosen. Therefore, material sheets of greater wall thickness s receive larger vault structures than thin material sheets.

The process according to the invention guarantees high inherent stability of profiled material sheets and a small degree of plastic deformation of the material. The plastification reserves still in the material sheet can be used for secondary forming processes. Another embodiment of the process according to the invention is the use of the remaining plastification reserves of the profiled material sheet to improve the inherent stability even further. In the process according to the invention this is achieved, for example, by initiating the vault-structuring process described above by means of an elastic or hydraulic cushion, which is pressed against the material sheet and the supporting elements, and then pressing the cushion against the material sheets with increased pressure, so that the material is re-elongated in the region of the vault troughs. At the same time the friction between material sheet and supporting elements stops or restricts the movement of the material sheet in the direction of the vault trough, so that the material does not tear in the area of the supporting elements. The frictional effect is obtained by geometrical adjustment of an involute to the supporting elements in direction of the vault trough. The geometrical design of the contour of the supporting elements takes into account the minimum bending radii, which depend, among other things, from the wall thickness and the material properties of the material sheet to be profiled.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means-plus-function clause are intended to cover the structures described herein as performing the recited function and not only structural equivalents but also equivalent structures.

BRIEF DESCRIPTION OF THE DRAWINGS

Further advantageous design features as a result of the invention are described below. Various embodiments of the invention are described in the attached drawings and described in more detail.

DETAILED DESCRIPTION OF THE INVENTION

Figure 1:
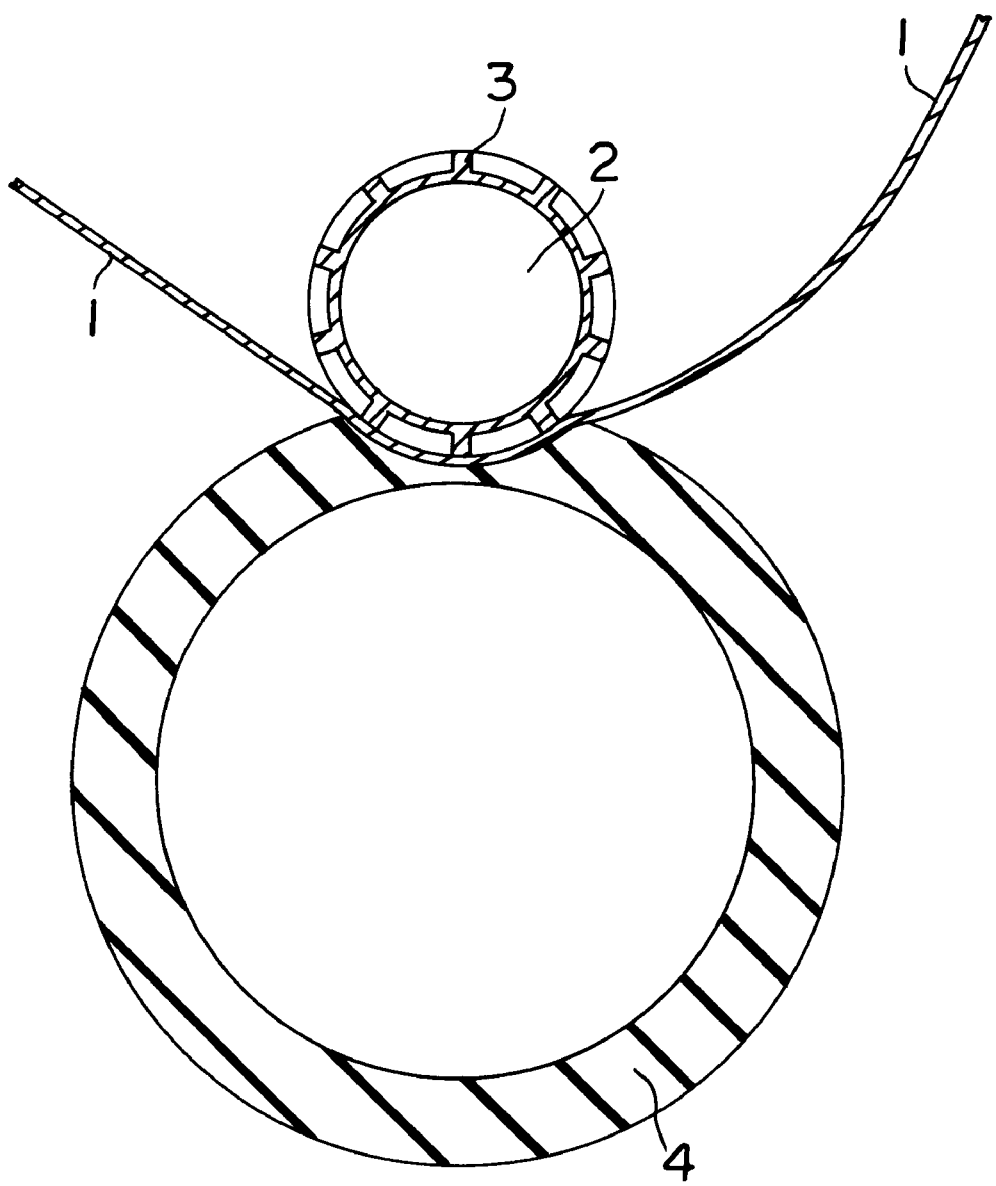
FIG. 1: schematic design of a device for producing vault-structured material sheets and/or foils by means of a flexible pressure roller and a roller on which supporting elements are arranged (radial section).

FIG. 1 depicts the basic structure of a device for application of the process according to the invention for producing vault-structured material sheets or foils. The material sheet 1 is bend around roller 2, on which supporting elements 3 are arranged, and pressurized by means of the elastic pressure roller 4 to create the vault structures of the material sheet.

Figure 2A:
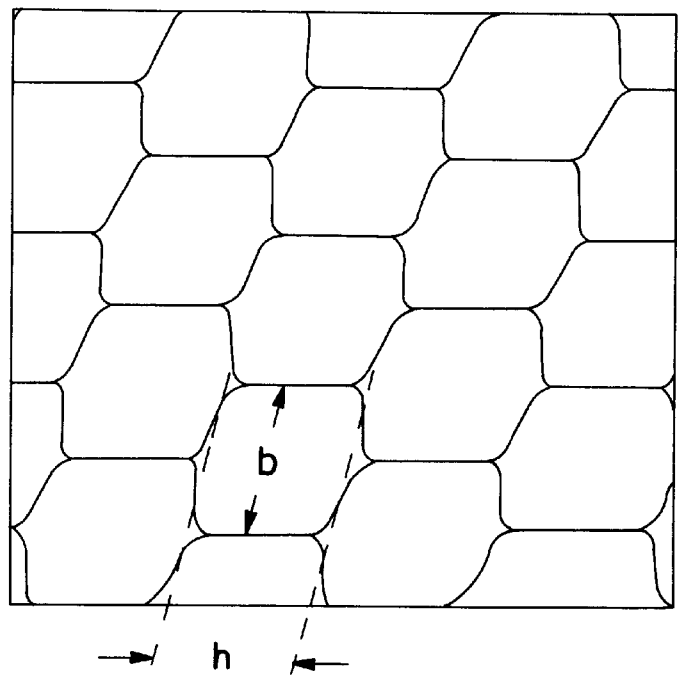
FIGS. 2A and 2B: aspect of two vault structures produced by means of a device equipped with an elastic, single-thread, helical supporting spiral.
Figure 2B:
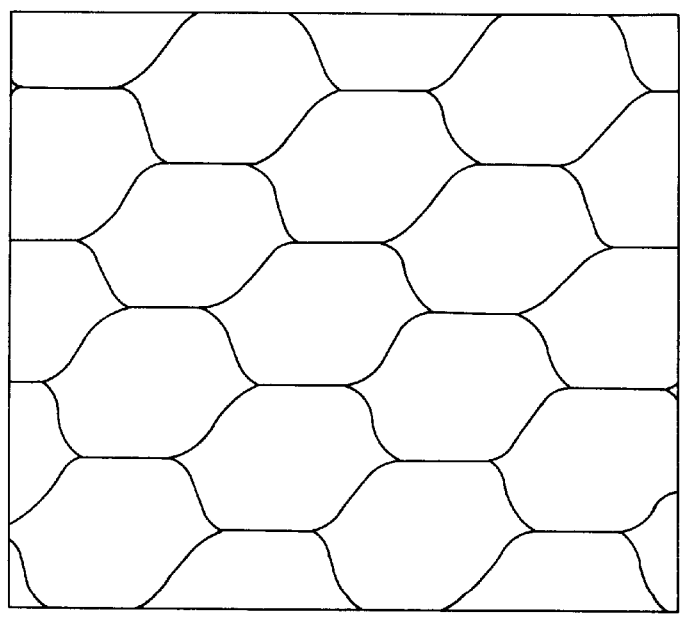
Figure 3:
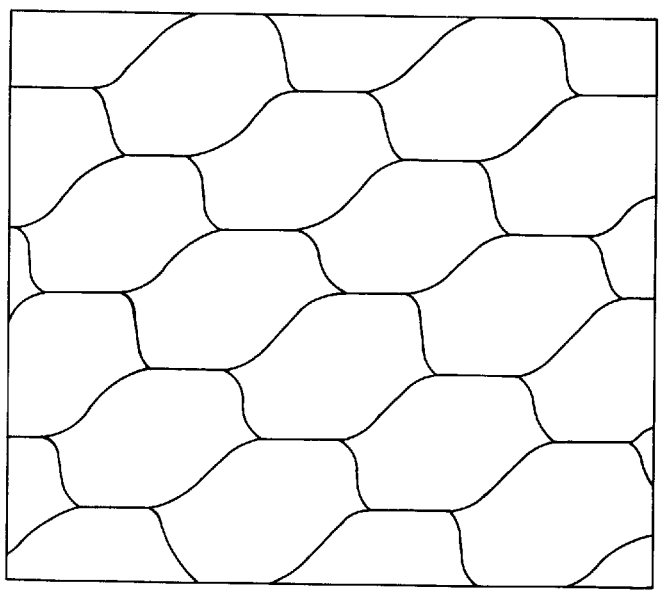
FIG. 3: aspect of a vault structure produced by means of a device equipped with an elastic, multi-thread, helical supporting spiral.

FIGS. 2A, 2B and 3 show the aspect of unrolled vault-structured material sheets:

In FIGS. 2A, 2B and 3 structures are shown that result if the vault folds adjust by self-organizing. This happens, for example, if a flexible helical spiral that gives way in the direction of the pressure is used as supporting element instead of a rigid helical spiral. In this case spade-shaped structures with tapered vault folds are created perpendicular to the direction of feed of the material sheet, and lateral, roughly S-shaped, vault folds in the direction of feed. The direction of feed in FIGS. 2A and 2B is along the long side of the sheet of paper. In FIGS. 2A and 2B a single-thread, helical supporting spiral was used. FIGS. 2A and 2B show two spade-shaped structures that differ in the shape of their lateral and tapered vault folds. The lateral vault folds are at the mean distance h from each other, while the vault folds perpendicular to the direction of feed of the material sheet are at the mean distance b from each other. In FIG. 3 a multi-thread helical supporting spiral was used. In this way different angles between the arrangement of the vault structures and the direction of the material sheet can be adjusted, because due to the directional dependence of the inherent stability it can be to advantage to produce the vault structures not by means of supporting elements arranged in the direction of or perpendicular to the direction of feed, but at an adjustable angle to it.

Figure 4:
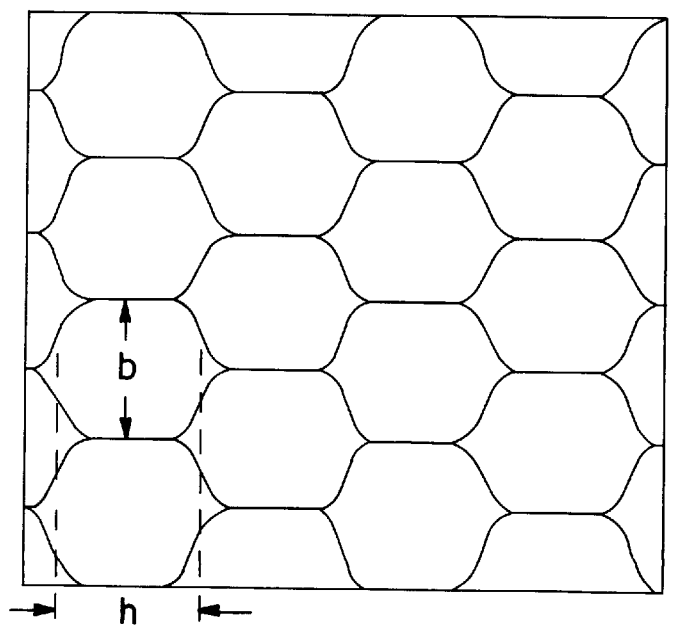
FIG. 4: aspect of a vault structure produced by means of a device equipped with spade-shaped, rigid supporting elements.
Figure 5A:
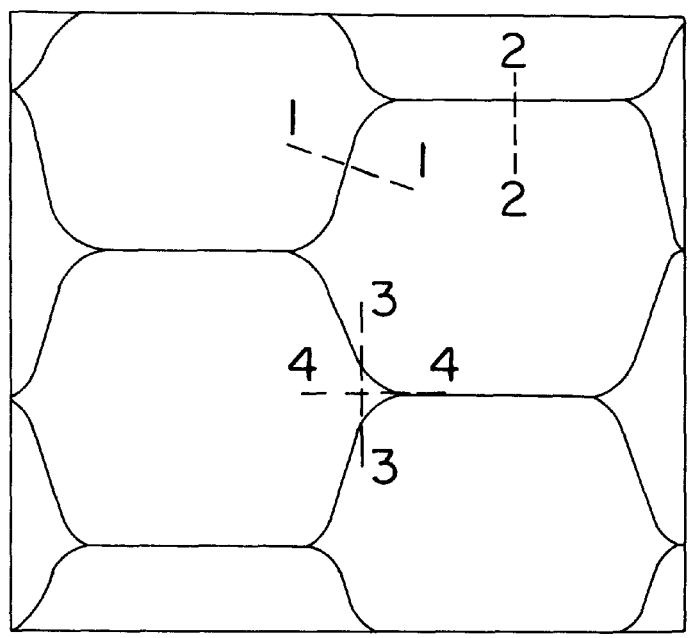
FIGS. 5A, 5B, 5C, 5D and 5E: schematic design of supporting elements for producing spade-shaped vault-structured material sheets: aspect of supporting elements and four cross sections of supporting elements.
Figure 5B:
Figure 5C:
Figure 5D:
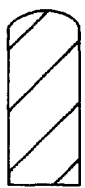
Figure 5E:
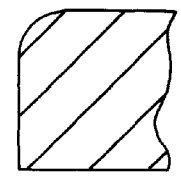

FIG. 4 shows an aspect of a vault structure produced by means of a device equipped with spade-shaped, rigid supporting elements. The shape and the contour of these rigid supporting elements correspond to a large extent with the spade-shaped vault folds that arise from self-organization. Because the radii of the individual rounded (e.g. S-shaped) supporting elements are not fixed, the variation range for roughly spade-shaped vault structures is wide.

FIGS. 5A, 5B, 5C, 5D and 5E explain the schematic design of rigid supporting elements for producing spade-shaped vault-structured material sheets by showing an aspect and four cross sections. In the aspect the regions of the supporting elements for which the contours of the supporting elements are depicted in cross sections are indicated by broken lines. Marking 1 . . . 1 is the cross section of a supporting element in the area of the lateral, roughly S-shaped vault fold. The design of the rounded contour of the supporting element has to take into consideration the minimum bending radius of the material sheet to be profiled. Marking 2 . . . 2 is the cross section of a supporting element in the area of the vault fold perpendicular to the direction of feed of the material sheet. The contour of this supporting element is likewise rounded. Markings 3 ... 3 and 4 ... 4 are exemplary cross sections of a rounded saddle of several converging supporting elements. Although the supporting element shows a tapered shape in the aspect, the contours of the cross section of this saddle are smoothly rounded.

Figure 6A:
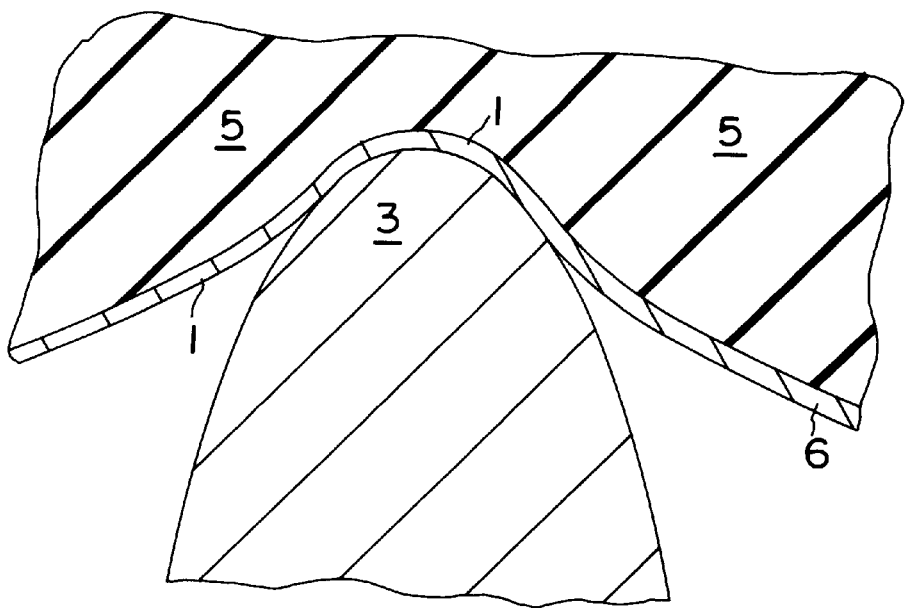
FIGS. 6A and 6B: schematic design of rigid supporting elements for producing spade-shaped vault-structured material sheets with re-elongation of the material.
Figure 6B:
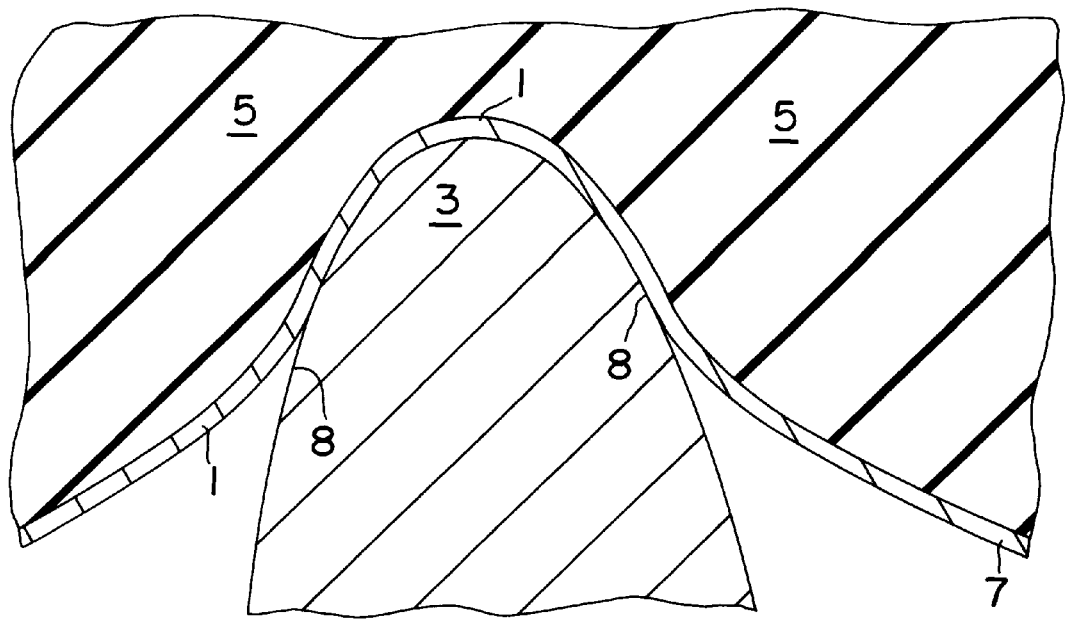

FIGS. 6A and 6B show two enlarged cross-sections of the schematic design of rigid supporting elements for producing spade-shaped vault-structured material sheets with re-elongation of the material in order to further improve the inherent stability. In FIG. 6A, the elastic or hydraulic cushion 5 presses against material sheet 1 and supporting element 3 and thus triggers the vault-structuring process. In this process the vault troughs of material sheet 6 at first form freely and possess large plastification reserves. In FIG. 6B, if cushion 5 presses against the material sheet with increased pressure, the material is re-elongated in the area of the vault troughs 7. The flow of the material 1 in the direction of the vault trough is stopped or restricted due to the friction between material sheet 1 and supporting element 3, so that the material sheet 1 does not tear in the region of the upper rounded contour of supporting element 3. This frictional effect is obtained by geometrical adjustment to the supporting elements 3 of an involute 8.

Figure 7A:
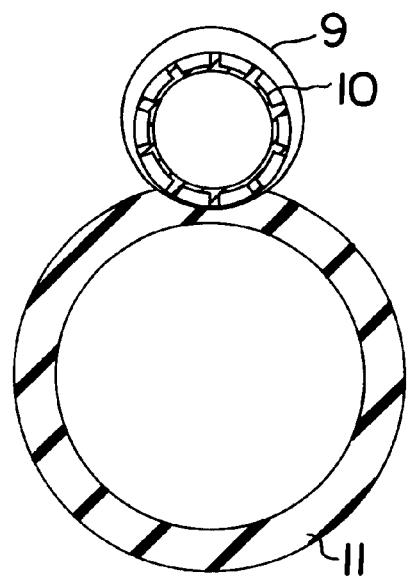
FIGS. 7A and 7B: exemplary schematic design of a device for application of the process according to the invention, with a roller with supporting elements and a flexible pressure roller, for producing spade-shaped vault-structured cans.
Figure 7B:
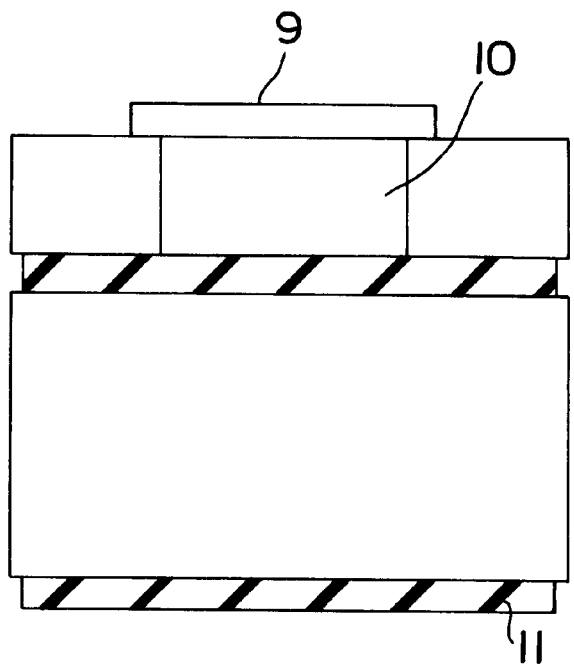

FIGS. 7A and 7B show the basic structure of a device for application of the process according to the invention for producing a profiled can 9 by means of a supporting element roller 10 and a flexible pressure roller 11 (in cross section in FIG. 7A and longitudinal section in FIG. 7B). The supporting roller 10, which is smaller than the diameter of the can, is inside the can and the pressure roller is outside it, so that the vault-structuring described above takes place.

Figure 8:
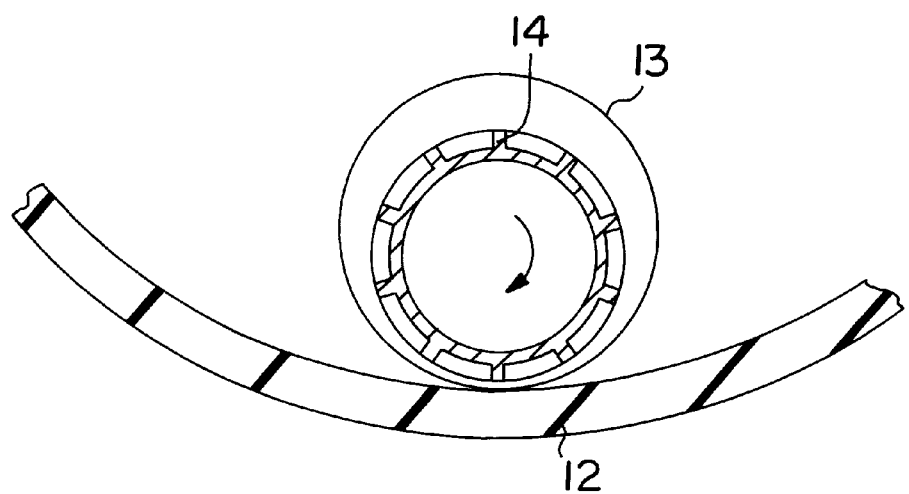
FIG. 8: exemplary schematic design of a device for application of the process according to the invention, with a roller with supporting elements and a concave flexible pressure cushion, for producing vault-structured cans.

FIG. 8 shows the basic structure of another device for application of the process according to the invention for producing profiled cans. Instead of the flexible pressure roller, a concave-shaped, flexible cushion 12, which closely conforms to the can body and ensures even distribution of the pressure on the can body and the supporting element roller 14, presses against the can body 13.

Figure 9:
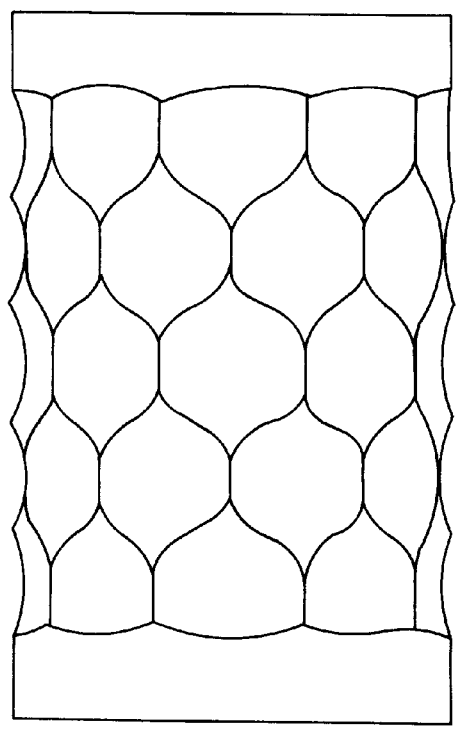
FIG. 9: side view of a spade-shaped vault-structured can.

FIG. 9 shows the side view of a spade-shaped vault-structured can with tapering vault folds in axial direction.

A benefit of the vault-structuring according to the invention is that rolled material sheets with increased inherent stability in the direction of rolling (anisotropic) can be provided with the same inherent stability in all directions (isotropic behavior).

Although the present invention has been described with reference to specific embodiments, it is appreciated by those skilled in the art that changes in various details may be made without departing from the invention defined in the appended claims.

The published PCT application to which the present U.S. application corresponds, namely PCT/EP97/01465, the published Fed. Rep. of Germany application from which it claims priority 196 11478.0, as well as all documents cited in the International Search Report issued thereon, including Fed. Rep. of Germany Patent No. DE 44 37 986 issued to Mirtsch on Apr. 25, 1996, International Application No. WO 94 22612 issued to Mirtsch on Oct. 13, 1997, Fed. Rep. of Germany Patent No. DE 43 11 978 issued to Mirtsch on Apr. 21, 1996, Fed. Rep. of Germany Patent DE 23 18 680 issued to Baier K G Maschinenfabrik GEB on Oct. 31, 1974, French Patent No. 1 463 640 issued to Hartman on Dec. 23, 1966, Fed. Rep. of Germany Patent No. DE 20 23 775 issued to Deutsche Tafelglas A G on Jan. 13, 1972, Patent Abstracts of Japan, vol. 007, no. 244 (M-252) dated Feb. 28, 1983, and Japanese Patent No. JP 58 131036 issued to Tokyo Shibaura Denki K K on Aug. 4, 1983, are hereby expressly incorporated by reference as if set forth in their entirety herein.

The components disclosed in the various publications, disclosed or incorporated by reference herein, may be used in the embodiments of the present invention, as well as, equivalents thereof.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

Some examples of structures in which the present invention may possibly be used are as follows:

| U.S. Pat. No. | Inventors | Title |
| --- | --- | --- |
| German Laid Open Patent Appln. DE-0S 28 00 221.3 and German Patent No. P 28 00 221 | Hollman, Meissner, Spickernagel | Lining for shafts and roadways in mining and tunneling |
| German Laid Open Patent Appln. DE-0S 28 00 222.4 and German Patent No. P 28 00 221 | Hollman, Spickernagel Rawert | Lining for shaft and roadways in mining and tunneling |
| U.S. Pat. No. 4389792 | Fuchs | Drill core inclinometer |
| U.S. Pat. No. 4251108 | Nocke | Method of and an arrangement for longwall mining |
| U.S. Pat. No. 4344357 | Mittelkotter | Apparatus for extending ventilating conduits |
| U.S. Pat. No. 4361079 | Christensen et al. | Apparatus for extending ventilating conduits |

All of the patents, patent applications and publications recited herein, and in the Declaration attached hereto, are hereby incorporated by reference as if set forth in their entirety herein.

The corresponding foreign and international patent publication applications, namely, Fed. Rep. of Germany Patent Application No. 196 14478.0, filed on Mar. 23, 1996, and PCT/EP97/01465, filed on Mar. 22, 1997, having inventors Frank Mirtsch, Olaf Büttner, and Jochen Ellert, and International Application No. PCT/EP97/01465 filed on Mar. 22, 1997, as well as their published equivalents, and other equivalents or corresponding applications, if any, in corresponding cases in Fed. Rep. of Germany and elsewhere, and the references cited in any of the documents cited herein, are hereby incorporated by reference as if set forth in their entirety herein.

The above discussed embodiments of the present invention will be described further hereinbelow with reference to the accompanying figures. When the word "invention" is used in this specification, the word "invention" includes "inventions", that is, the plural of "invention". By stating "invention", the Applicants do not in any way admit that the present application does not include more than one patentably and non-obviously distinct invention, and maintains that this application may include more than one patentably and non-obviously distinct invention. The Applicants hereby assert that the disclosure of this application may include more than one invention, and, in the event that there is more than one invention, that these inventions may be patentable and non-obvious one with respect to the other.

The details in the patents, patent applications and publications may be considered to be incorporable, at applicant's option, into the claims during prosecution as further limitations in the claims to patentably distinguish any amended claims from any applied prior art.

The invention as described hereinabove in the context of the preferred embodiments is not to be taken as limited to all of the provided details thereof, since modifications and variations thereof may be made without departing from the spirit and scope of the invention.

What is claimed is:

1. A process for vault-structuring, in which a curved material is formed, said process comprising supporting a material on supporting elements arranged at distances from each other and in which a forming pressure is applied on the side of said material opposite said supporting elements in such a way that said material is profiled with vault structures including vault folds evolving by themselves thus subsiding said supporting elements in the direction of said forming pressure while said forming pressure is being applied wherein said vault folds self-adjust to a predetermined shape due to subsiding of said supporting elements in such a way that said vault folds withstand said forming pressure with plastification being minimized to thereby provide a vault-structured material with enhanced inherent stability.

2. The process according to claim 1, wherein said vault folds evolve by themselves in a self-organized manner, and wherein said vault folds self-adjust to an optimized shape.

3. Process according to claim 1, characterized by the fact that said vault folds support each other.

4. Process according to claim 3, characterized by the fact that spade-shaped vault structures form in horizontal projection.

5. Process according to claims 4, characterized by the fact that, in their cross section, said vault structures have rounded or tapered folds.

6. Process according to claim 5, characterized by the fact that the edges of each of said vault folds are rounded in the cross section of said folds so that each of said folds lack sharp edges.

7. Process according to claim 6, characterized by the fact that a single-thread or multi-thread or flexible helical spiral is used as said supporting elements.

8. Process according to claim 7, characterized by the fact that shortened vault folds form perpendicular to the direction of feed of said material.

9. Process according to claim 8, characterized by the fact that exclusively rounded vault folds are produced in lateral direction of said material.

10. Process according to claim 9, characterized by the fact that said vault folds in lateral direction of said material are S-shaped.

11. Process according to claim 10, characterized by the fact that said vault folds form flattened material saddles.

12. Process according to claim 11 wherein the dimensions of said vault folds of said material that evolve by themselves are determined first and thereafter said supporting elements are adjusted to said dimensions of said vault folds.

13. Process according to claim 12, characterized by re-elongation of said vault folds.

14. Process according to claim 13, characterized by vault-structuring in two stages, wherein vault structuring is initiated by a first pressure and said vault folds are re-elongated by an increased second pressure.

15. Process according to claim 14, characterized by frictional locking between said material and said supporting elements during re-elongation.

16. Process according to 15, wherein said frictional locking is obtained by geometrical adjustment to the supporting elements of an involute.

17. Process according to claim 16, characterized by the fact that the angle between said supporting elements and the direction of feed of said material is adjusted.

18. Process according to claim 17, characterized by the fact that the modification of said angle optimizes said inherent stability of said material.

19. Process according to claim 17, characterized by the fact that the depth of said vault folds are adjusted in the direction of and/or perpendicular to the direction of feed of said material.

20. Process according to claim 19, characterized by the fact that rolled, smooth, anisotropic material sheets are provided with isotropic properties by said modification of said angle between said supporting elements and the direction of feed of said material and of said depth of said vault folds.

21. Process according to claim 20, characterized by the fact that a flexible pressure roller or a concave-shaped cushion is used to apply said forming pressure; and further characterized by the fact that the geometrical dimensions of said supporting elements and said vault structures are determined by the following equations:

$$n = \frac{2.45 * D^{0.5}}{h^{0.333} * s^{0.2}}$$

$$n = \frac{D * \pi}{b}$$

$$h = b = 1.45 * D^{0.75} * s^{0.3}$$

where
a) n is the number of said vault structures in the direction of feed of said material referred to one turning cycle of said supporting elements;
b) D is the diameter in mm of said supporting elements;
c) h is the mean distance in mm of lateral supporting elements from each other;
d) s is the thickness in mm of said material;
e) b is the distance in mm of said vault folds perpendicular to the direction of feed of said material; and
f) $\pi$ is the number pi (3.14).

* * * * *